E. S. WOODS & A. A. WEIGEL.
A. G. WELCH, EXECUTOR OF E. S. WOODS, DEC'D.
ANTIFRICTION SIDE BEARING.
APPLICATION FILED DEC. 26, 1912.
1,161,433.
Patented Nov. 23, 1915.
3 SHEETS—SHEET 1.
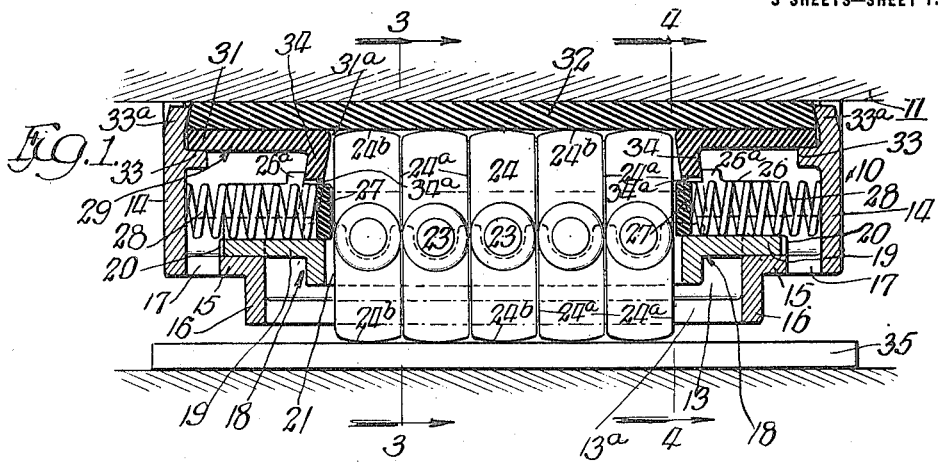
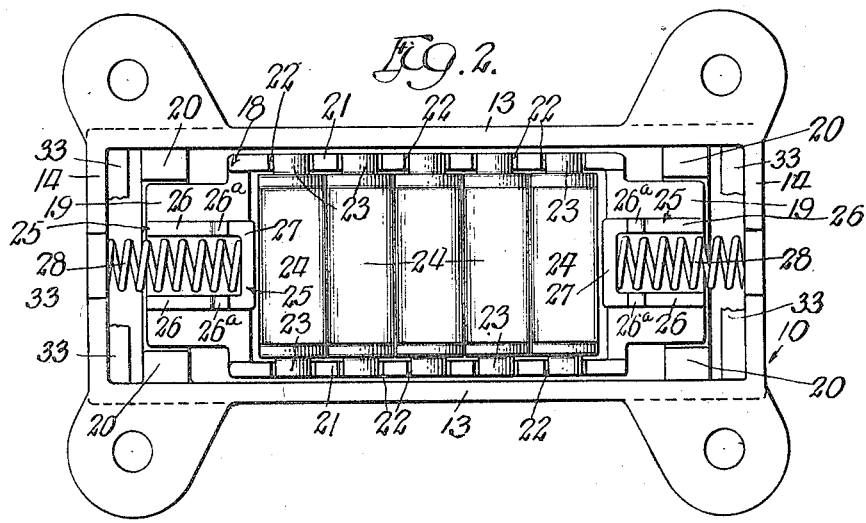
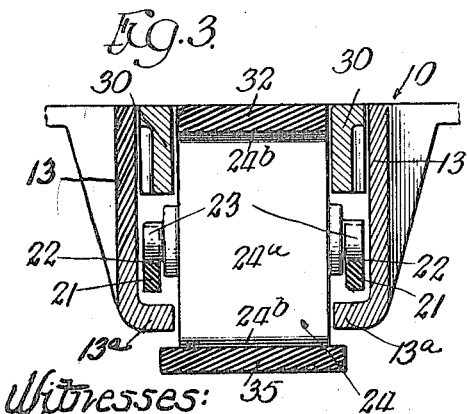
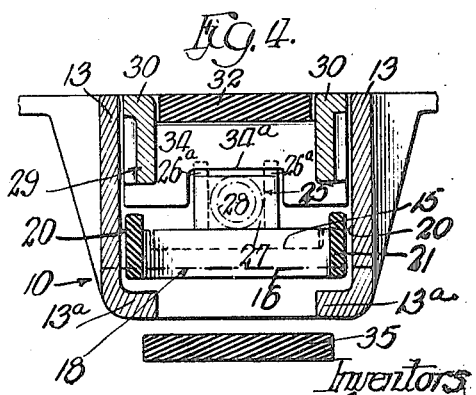
Inventors
Edwin S. Woods
Arnold A. Weigel

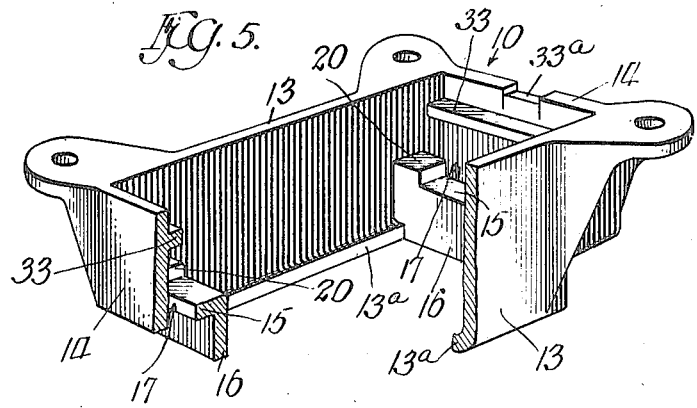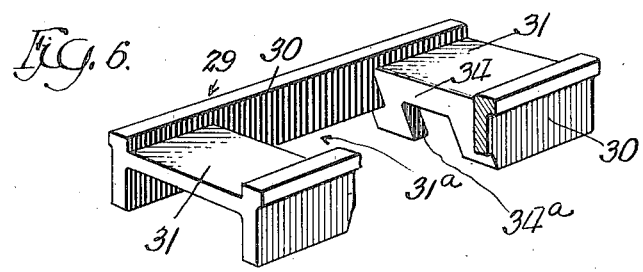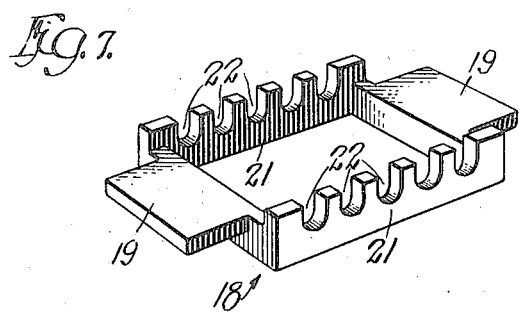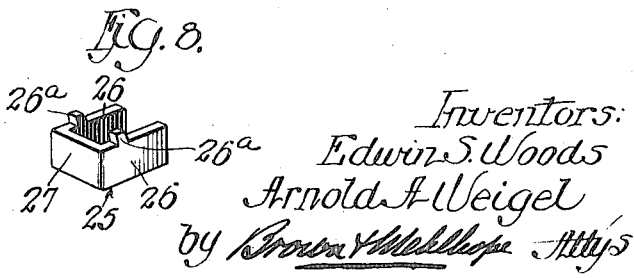

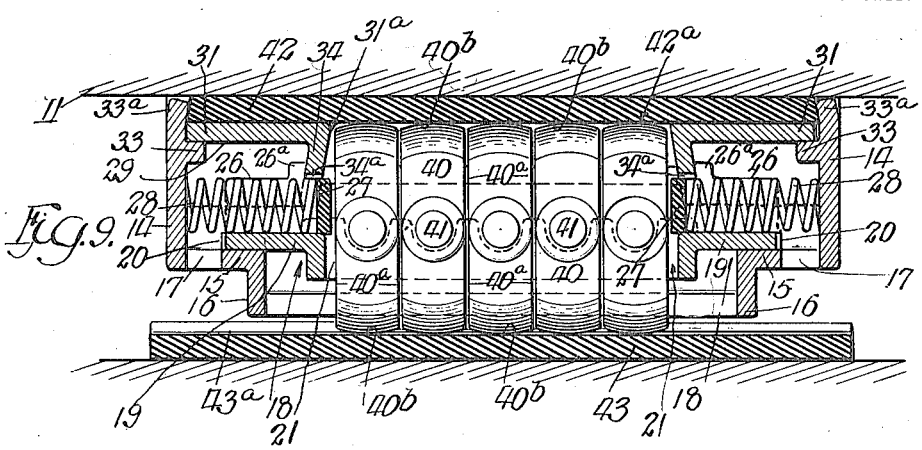
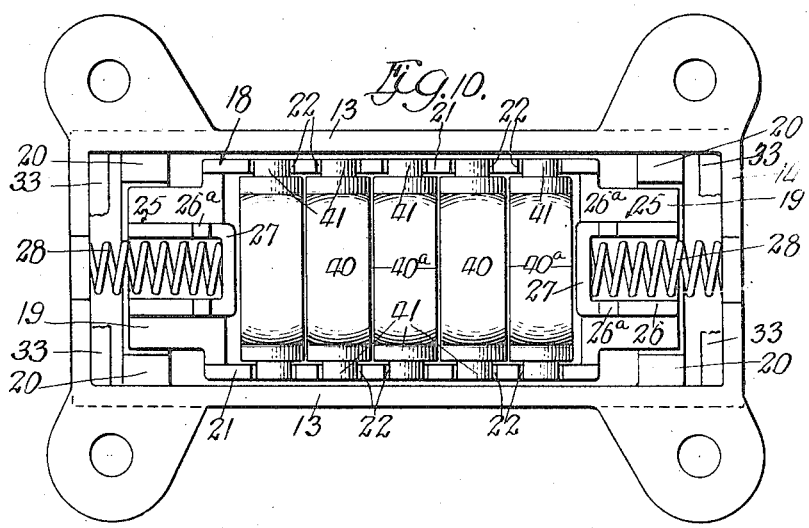
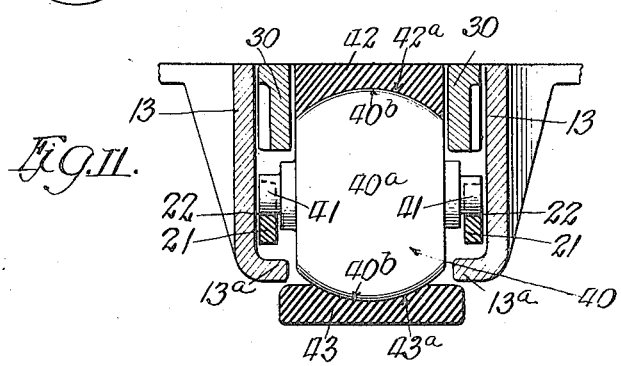

UNITED STATES PATENT OFFICE.

EDWIN S. WOODS AND ARNOLD A. WEIGEL, OF CHICAGO, ILLINOIS; SAID WEIGEL ASSIGNOR TO SAID WOODS; ALBERT G. WELCH, EXECUTOR OF SAID WOODS, DECEASED, ASSIGNOR TO ALBERT G. WELCH, TRUSTEE.

ANTIFRICTION SIDE BEARING.

1,161,433.   Specification of Letters Patent.   Patented Nov. 23, 1915.

Application filed December 26, 1912. Serial No. 738,514.

*To all whom it may concern:*

Be it known that we, EDWIN S. WOODS and ARNOLD A. WEIGEL, citizens of the United States, and residents of Chicago, in the county of Cook and State of Illinois, have invented certain new and useful Improvements in Antifriction Side Bearings; and we do hereby declare that the following is a full, clear, and exact description thereof, reference being had to the accompanying drawings, and to the letters of reference marked thereon, which form a part of this specification.

This invention relates to improvements in side bearings and consists of the matters hereinafter set forth and more particularly pointed out in the appended claims.

In the drawings:—Figure 1 is a view representing a longitudinal central section through our improved side bearing. Fig. 2 is a view representing a top plan view of the same with the wear-plate at the top of the casing removed. Fig. 3 is a view representing a vertical transverse section through the side bearing in a plane indicated by the line 3—3 of Fig. 1. Fig. 4 is a view representing a vertical transverse section in the plane indicated by the line 4—4 of Fig. 1. Fig. 5 is a perspective view of the casing with a part broken away to show the interior construction. Fig. 6 is a perspective view of the frame that supports the wear-plate within the casing, said frame being partly broken away. Fig. 7 is a perspective view of the carriage that supports the antifriction elements within the casing. Fig. 8 is a perspective view of one of the boxes that provide bearing for the centering springs to be referred to later. Fig. 9 is a view representing a vertical section through a modified form of our improved side bearing. Fig. 10 is a view similar to Fig. 2 showing the modified form of bearing. Fig. 11 is a view similar to Fig. 3 of the modified form of bearing.

Referring now to that embodiment of our invention illustrated in the drawings and particularly in Figs. 1 to 8, inclusive, 10 indicates the casing which supports the antifriction elements contained in the bearing and which is attached to the body-bolster 11 of a car in a familiar manner. As shown, the said casing is open top and bottom and consists of an oblong rectangular shell having side walls 13, 13, and end walls 14, 14. The casing is provided at the bottom near each end with transverse horizontal bars 15, 15, which, as shown, are integral with the casing and which are provided with depending flanges 16, 16, at their edges that are nearer the center of the casing. The bars 15, 15 are preferably spaced from the end walls 14, 14 of the casing, in order to leave a transverse slot or opening 17, adjacent each end of the casing to permit any dust, sand, cinders or the like that collects within the casing to drop out as it works toward the ends thereof.

18 indicates a cage or carriage which supports the antifriction elements. Said cage or carriage consists of an oblong rectangular frame adapted to fit within the casing and having flat, horizontal end extensions 19, 19 which bear upon and have sliding engagement with the transverse bars 15, 15 of the casing. Said end extensions 19 are narrower than the space between the side walls 14 of the casing and have lateral guiding engagement with upright lugs 20, 20, rising from the supporting transverse bars 15, 15, and projecting inwardly from the side walls of the casing. The side walls 21, 21 of the carriage constitute supporting rails for a plurality of closely spaced, antifriction elements 24 and are provided with longitudinally spaced, half-round grooves 22 to receive the trunnions 23 of said antifriction elements 24.

Each of the antifriction elements 24 is a segment of a cylinder and, as shown, there are five of such antifriction elements in the casing. Each antifriction element has flattened sides $24^a$, $24^a$, and rounded top and bottom bearing surfaces $24^b$, $24^b$, which are concentric with the common longitudinal central axis of its trunnions 23. Said antifriction elements are assembled in the carriage so that their flattened sides are closely adjacent and are so arranged that when they are transmitting load, they will rock or oscillate in unison. While the sides of the antifriction elements are thus placed close together, they must not, when they have plane surfaces as shown herein, be in contact, since they will not then be capable of oscillatory movement as will readily be apparent to those familiar with the art.

At each end of the casing and having sliding bearing on top of the end extension 19 of the carriage, there is located a frame or box 25, U-shaped in horizontal cross-section. Said box has longitudinal side members 26 and a transverse end member 27. A coiled spring 28 is located in said box with one end engaging against the transverse member 27 thereof and with its other end engaging against the proximate end wall 14 of the casing.

In the top of the casing is supported a removable frame 29 which comprises longitudinally extending, vertical side plates 30 and transverse horizontal plates 31 which rigidly connect the side plates and are placed below the top edges of said plates and near the ends thereof with a space 31$^a$ separating them. The top edges of the plates 30 are located in the plane of the top of the casing, and their bottom edges provide upper rails located above the trunnions 23 of the antifriction elements. The transverse plates 31 support a wear-plate 32 which extends across the space 31$^a$ separating the transverse plates 31 from each other. Through this space the tops of the antifriction elements project when brought into engagement with the under surface of the wear-plate 32.

The plates 31 of the frame rest on transversely extending horizontal shoulders 33 on the end walls 14 of the casing. Tongues 33$^a$ are cut in said end walls and bent over against the beveled ends of the wear-plate 32 so as to lock said wear-plate and supporting frame 29 in place in the casing in a familiar manner. The inner ends of the plates 31 have depending flanges 34 which extend transversely of the casing and are inclined downwardly and toward the ends of the casing. Said flanges act as stops to limit the oscillatory movement of the antifriction elements, as will presently appear.

The movement of the U-shaped boxes 25 toward the space occupied by the antifriction elements under the expansive action of their respective springs is limited by upright lugs 26$^a$ on the side walls 26 of said boxes, which lugs engage against the inclined flanges 34 of the plates 31 which have downwardly opening notches 34$^a$ in line with said boxes to permit them to project through said flanges in order that they may be engaged by the end ones of the plurality of antifriction elements.

The operation of our improved side bearing is as follows: The bearing, as illustrated in the drawings, is shown with the bottom bearing surfaces 24$^b$ of the antifriction elements engaged against a wear-plate 35 attached to the truck-bolster of a car as would be the case when the bearing is transmitting load. In such position, the trunnions of the antifriction elements are raised from supporting engagement in their respective grooves in the side rails 21 of the carriage, but are still located within said grooves so as to be capable of engagement against one or the other of the side walls of said grooves as they are moved horizontally in one direction or the other in the oscillatory movement of the antifriction elements. As the truck-bolster and car-bolster are shifted the one with reference to the other, the antifriction elements rock or oscillate in unison under the movement of said parts, and the flat side face of the end one of the set of antifriction elements is brought to engage against the transverse wall 27 of that end box 25 toward which said elements are rocked. This produces a movement of said box on the horizontal end extension 19 of the carriage which puts said spring contained in said box under compression. At the same time a longitudinal movement in the same direction will be communicated to the carriage 18 by reason of the engagement of the trunnions of the antifriction elements against the sides of their respective grooves in the rails 21. When in the movement of the car the lower bearing surfaces of the antifriction elements are released, the antifriction elements will drop so as to bring their trunnions into supporting engagement with the bottoms of their respective grooves 22, and the spring 28 which has been compressed will, by its expansion, cause a rocking movement of all of the antifriction elements so as to bring them again into vertical position, and will also, through the engagement of the trunnions of said antifriction elements with the sides of their respective grooves in the rails 21 of the carriage, cause a sliding movement of said carriage so as to bring it back to its normal central position.

The side walls 13 of the casing are provided as shown with horizontal flanges 13$^a$ which project inwardly toward the ends of the antifriction elements and together with the side plates 30 of the wear-plate supporting frame 29 act to prevent the antifriction elements from displacement in the direction of their length.

Our improved side bearing is of particular advantage for use where heavy loads are to be supported and but small relative movement occurs between the truck and body-bolsters as in the case of engine tenders. Since the oscillatory movement required of the antifriction elements in such case is limited, each element may be made so that its vertical section approximates its section of load transmission which may be defined as that part of its section included between the upper and lower arcs on which said section rolls during an oscillation of the greatest required amplitude and defined laterally by right lines connecting the ends of said arcs. Since this section is quite narrow compared to the height of the antifriction element, a plurality of such elements may be provided in a casing of the usual length and the load sustaining power of the bearing may be thus proportionately increased.

In the modification of our invention thus far described, the antifriction element is in the form of the segment of a cylinder, but apparently the invention is not limited to this specific form of antifriction element. Other forms of oscillatory or rocking antifriction elements, having like characteristics may be used and in Figs. 9 to 11, we have shown an antifriction element which is in the form of a segment of a ball. In said views the parts of the casing of the carriage and the associated features are indicated by like numerals of reference heretofore used.

40 indicates the antifriction elements which have spheric bearing surfaces $40^b$, $40^b$ and flattened sides $40^a$, $40^a$, the antifriction elements being in the form of segments of spheres. Said antifriction elements have trunnions 41 as before.

42 indicates the upper wear-plate and 43 the lower wear-plate between which said antifriction elements are engaged, said wear-plates being provided with transversely rounded grooves $42^a$, $43^a$, respectively, adapted to fit the transversely rounded spheric bearing surfaces of the antifriction elements with which they engage.

The operation of the construction shown in the last named views is apparently the same as that heretofore described. Other modifications of the form of the antifriction element will be apparent to those skilled in the art.

While we have referred to the sides of the antifriction elements as "flat" or "flattened," and have illustrated said antifriction elements in the drawings as having side faces which are plane surfaces, it is to be understood that said side faces are not necessarily plane surfaces and that the terms "flat sided" and "flattened sides," as used in the description and in the claims, are merely used as a convenient term for describing this type of antifriction element, which has been fully disclosed and various modifications of which have been described in Letters Patent No. 995,835, heretofore granted to one of the co-inventors herein on June 20th, 1911, in connection with an antifriction center bearing.

While in describing our invention we have referred to certain details of mechanical construction and arrangement it is to be understood that the invention is in no way limited thereto except as may be pointed out in the appended claims.

We claim as our invention:—

1. An antifriction side bearing comprising relatively oscillatory bearing members and an interposed series of closely spaced antifriction elements, all of which are adapted to oscillate upon axes located intermediate said bearing members, the cross-section of each antifriction element taken at right angles to its axis of oscillation, approximating its section of load transmission, and means for returning said antifriction elements to predetermined vertical positions after they are released from transmitting load.

2. An antifriction side bearing comprising relatively oscillatory bearing members and an interposed series of closely spaced antifriction elements, all of which are adapted to oscillate on axes located intermediate said bearing members, the cross-section of each antifriction element taken at right angles to its axis of oscillation, being greater in one direction than in a direction at right angles thereto and means for returning said antifriction elements to predetermined vertical positions after they are released from transmitting load.

3. In a side-bearing, a casing, a plurality of closely spaced flat-sided antifriction elements in said casing, said antifriction elements being capable of limited oscillatory movement in said casing, and means for returning said antifriction elements to predetermined vertical positions in said casing, after they are released from transmitting load.

4. In a side-bearing, a casing, a plurality of closely spaced, flat-sided antifriction elements suspended in said casing, said antifriction elements being capable of limited vertical and oscillatory movement in said casing, and means for returning said antifriction elements to predetermined vertical positions in said casing, after they are released from transmitting load.

5. In a side-bearing, a casing, means providing longitudinally-extending rails in said casing, a plurality of closely spaced flat-sided antifriction elements provided with trunnions adapted for supporting engagement with said rails, and means for returning said antifriction elements to predetermined vertical positions in said casing when they are released from transmitting load.

6. In a side-bearing, a casing, means providing longitudinally-extending rails in said casing, a plurality of closely-spaced flat-sided antifriction elements provided with trunnions adapted for supporting engagement with said rails, and resilient means for returning said antifriction elements to predetermined vertical positions in said casing when said antifriction elements are released from transmitting load.

7. In a side-bearing, in combination with upper and lower bearing plates, a plurality of flat-sided, closely spaced, oscillatory antifriction elements adapted to transmit load between said bearing plates, a casing for supporting said antifriction elements and means for returning said antifriction elements to predetermied vertical positions in said casing after they are released from transmitting load.

8. In a side-bearing, in combination with upper and lower bearing plates, a plurality of flat-sided, closely spaced, oscillatory antifriction elements adapted to transmit load between said bearing plates, a casing for supporting said antifriction elements and resilient means for returning said antifriction elements to predetermined vertical positions in said casing after they are released from transmitting load.

9. In a side-bearing, in combination with a casing, a carriage longitudinally movable in said casing, a plurality of closely spaced, flat-sided antifriction elements suspended in said carriage, and means for returning said antifriction elements to predetermined vertical positions in said casing when said antifriction elements are released from transmitting load.

10. In a side-bearing, in combination with a casing, a carriage longitudinally movable in said casing, a plurality of closely spaced, flat-sided antifriction elements suspended in said carriage and resilient means adapted to return said antifriction elements to predetermined vertical positions in said casing when said antifriction elements are released from transmitting load.

11. In a side-bearing, in combination with a casing, a carriage longitudinally movable in said casing, a plurality of closely spaced, flat-sided antifriction elements suspended in said carriage, means for returning said antifriction elements to predetermined vertical positions in said casing when said antifriction elements are released from transmitting load and for simultaneously returning said carriage to a predetermined central position in said casing.

12. In a side-bearing, in combination with a casing, a carriage longitudinally movable in said casing, a plurality of closely spaced, flat-sided antifriction elements suspended in said carriage, resilient means adapted to return said antifriction elements to predetermined vertical positions in said casing when said antifriction elements are released from transmitting load and for simultaneously returning said carriage to a predetermined position in said casing.

13. In a side-bearing, in combination with a casing, a carriage longitudinally movable in said casing and provided with side rails, a plurality of flat-sided antifriction elements having trunnions for engagement with said rails, and resilient members located in each end of said casing and adapted to return said antifriction elements to predetermined vertical positions in said casing when released from transmitting load.

14. In a side-bearing, in combination with a casing, a carriage longitudinally movable in said casing and provided with side rails having longitudinally-spaced bearing notches therein, a plurality of closely spaced, flat-sided antifriction elements having trunnions adapted to be supported in said bearing notches, and a resilient member located in each end of said casing adapted to resist the oscillation of said antifriction elements from normal vertical position.

15. In a side-bearing, in combination with an open top casing, a wear-plate closing the top of said casing, and a carriage longitudinally movable in said casing having side rails provided with longitudinally-spaced half-round notches, a plurality of flat-sided, closely spaced antifriction elements provided with trunnions adapted to be supported in said notches, and a resilient member located in each end of said casing, adapted to resist oscillatory movement of said antifriction elements from their normal vertical position.

16. In a side-bearing, in combination with a casing open at the bottom, a carriage longitudinally movable in said casing, and transverse bars on which said carriage has sliding bearing, said bars being spaced from the end-walls of said casing to leave slots or openings for the purpose described.

17. In a side-bearing, in combination with a casing, a carriage longitudinally movable therein, and a plurality of closely spaced, flat-sided, antifriction elements supported in said carriage, boxes movable on said carriage and adapted to be engaged by the end antifriction elements when oscillated from normal position, springs interposed between said boxes and the proximate end walls of the casing, and means limiting the movement of said boxes toward said antifriction elements.

In testimony, that we claim the foregoing as our invention we affix our signatures in the presence of two witnesses, this 18th day of December, A. D. 1912.

EDWIN S. WOODS.
ARNOLD A. WEIGEL.

Witnesses:
GEORGE R. WILKINS,
KARL W. DALL.